Jan. 20, 1959 W. H. HEWITT, JR 2,870,418

WAVE GUIDE COMPONENTS CONTROLLED BY FERROMAGNETICALLY RESONANT ELEMENTS

Filed May 6, 1952 2 Sheets-Sheet 1

INVENTOR
W. H. HEWITT, JR.
BY N. S. Ewing
ATTORNEY

Jan. 20, 1959 W. H. HEWITT, JR 2,870,418

WAVE GUIDE COMPONENTS CONTROLLED BY FERROMAGNETICALLY RESONANT ELEMENTS

Filed May 6, 1952 2 Sheets-Sheet 2

INVENTOR
W. H. HEWITT, JR.
BY N. S. Ewing
ATTORNEY

United States Patent Office 2,870,418

Patented Jan. 20, 1959

2,870,418

WAVE GUIDE COMPONENTS CONTROLLED BY FERROMAGNETICALLY RESONANT ELEMENTS

William H. Hewitt, Jr., Mendham, N. J., assignor to Bell Telephone Laboratories, Incorporated, New York, N. Y., a corporation of New York Application May 6, 1952, Serial No. 286,343

18 Claims. (Cl. 333—7)

This invention relates to ferromagnetic resonance phenomena, and, more particularly, to the use of materials having differing ferromagnetic impedance states to control microwave energy.

The object of this invention is to provide a simple means for controlling the propagation of microwaves without use of manual adjustments. More specifically, the objects of this invention include the control of the frequency of resonators, the switching of circuits and the variation of impedances, in microwave systems without mechanical changes in the wave guide structure.

It has previously been proposed in my Patent 2,745,-069, granted May 8, 1956, to attenuate high frequency electromagnetic energy in wave guides by varying the magnetic field applied to ferrite elements in the wave guide structure.

In accordance with this invention microwave energy is incident on control elements, these elements are magnetically biased to different ferromagnetic impedance states, and the electromagnetic field distributions of the microwave energy are altered in accordance with varying intensity of magnetic field. In particular embodiments to be described in more detail hereinafter, waveguide termination impedances may be varied, resonant frequencies may be shifted, output channels may be selected and output signals may be selectively attenuated, by merely varying the magnetic field applied to the control elements, and thereby changing the resistive and reflective qualities of the control elements.

Other objects and advantages arising from the instant invention will be apparent from the detailed description of the drawings which will be presented hereinafter.

As is known in the art, various materials change their resistance or conductivity characteristics substantially in the presence of an applied magnetic field. By way of example, resistive films of iron or nickel are known to exhibit the typical peaked ferromagnetic resonance curves. More recently, as set forth in the above-mentioned Hewitt application, it has been discovered that various polycrystalline ferrites exhibit this change in attenuation with applied magnetic field to a remarkable degree.

Figure 1:
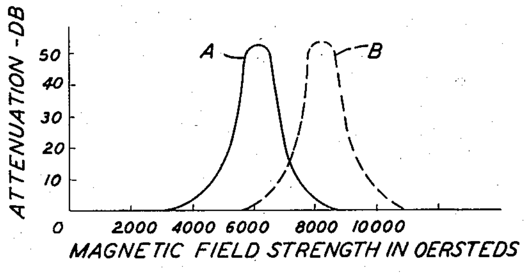
Fig. 1 is a plot of attenuation versus frequency for the two different attenuating elements of the types employed in the devices of Figs. 2–6.

In accordance with the present invention and as illustrated in Fig. 1, it is proposed to use control elements having differing resistance magnetic field characteristics in microwave systems. The plot of attenuation versus applied magnetic field for two ferromagnetic materials A and B is shown in Fig. 1. Note that material A has its ferromagnetic resonance attenuation peak at 6,000 oersteds while material B has its peak at 8,000 oersteds. Thus, when a magnetic field applied to two elements made of these different materials, is changed from 6,000 to 8,000 oersteds, the relative attenuation of the two elements is greatly changed. In addition, accompanying this change from an insulating character where they are relatively transparent to microwave energy toward increased conductivity where the attenuation through the materials is high, the reflective qualities of plates made of these materials is also greatly increased. For some purposes, it is helpful to consider this increase in reflective power as resulting from an effective conductive, reflecting film on the surface of the ferromagnetically resonant material.

Figure 2:
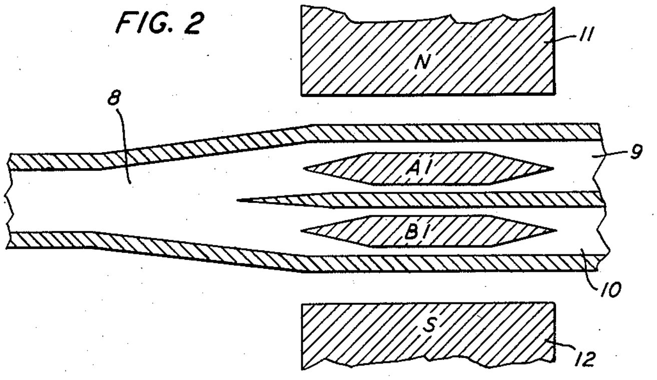
Fig. 2 shows a wave guide potentiometer.

An example of the use of this principle may be seen in the wave guide potentiometer arrangement of Fig. 2. This circuit employs a wave guide which is essentially a Y, with the wave guide 8 branching into the two output circuits 9 and 10. The arms on the double side are provided with ferromagentically resonant control elements or vanes A–1 and B–1 having attenuation curves as shown at A and B in Fig. 1. The magnetic field in the induction zone between the poles 11 and 12 is then varied between the values at which resonance occurs in the two control vanes. It is desirable, however, that these field strength values be far enough apart to prevent undue overlapping of the attenuation curves of the two vanes. With this arrangement, then, variation of the applied direct current magnetic field will decrease the energy passing through one arm and increase it through the other arm in accordance with the plot of Fig. 1.

Figure 3:
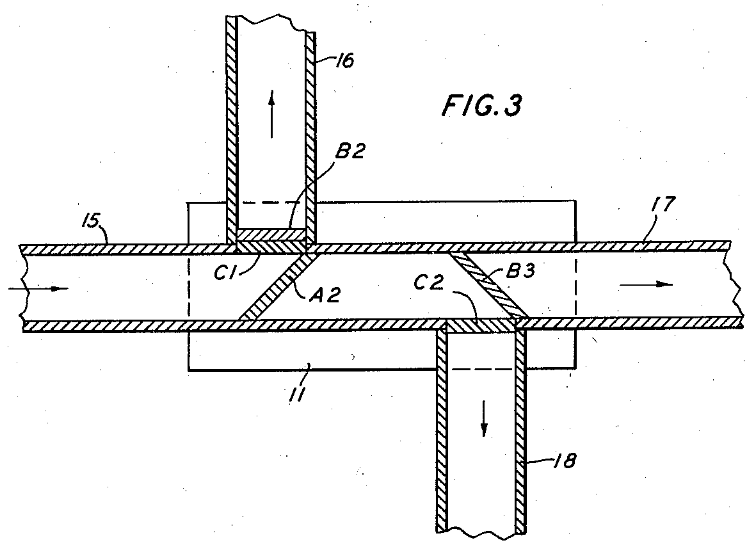
Fig. 3 depicts a microwave switching circuit.

In Fig. 3, an arrangement is shown whereby a circuit 15 may be effectively connected to any one of wave guides 16, 17 or 18, or to all three of them simultaneously. To accomplish the foregoing, the control plates shown in the wave guide are made of three different materials, A, B and C, which have their ferromagnetic resonance points at various magnetic field strengths, in a manner similar to the curves A and B as shown in Fig. 1. The control elements or plates A–2, B–2, B–3, C–1 and C–2 are all within the induction zone of the magnetic pole pieces 11 (behind the wave guide junction) and 12 (not shown) and face the main wave guide channel 15—17. Where the magnetic field is adjusted to the strength required for ferromagnetic resonance for material A, the attenuation through control plate A–2 becomes high and its reflective powers improve to a substantial extent, as set forth hereinbefore with respect to plates A–1 and B–1. Microwave energy from wave guide 15 incident on plate A–2 is thus reflected toward channel 16 and is blocked from channels 17 and 18. The ferromagnetically resonant control slabs B–2 and C–1 have their resonant peaks at other magnetic field strengths, and are thus relatively transparent to microwave energy reflected from plate A–2 toward channel 16. Similarly, when the field strength is raised to the value required for magnetic resonance for plates B–2 and B–3, energy from circuit 15 is diverted to circuit 18, and when changed to that required for resonance for plates C–1 and C–2 the energy travels straight through to circuit 17. In addition, if the field is reduced to a low value or raised beyond the resonant peaks of all three materials, energy from circuit 15 will be radiated into all three circuits 16, 17 and 18, in much the same manner as though no plates were present.

Figure 4:
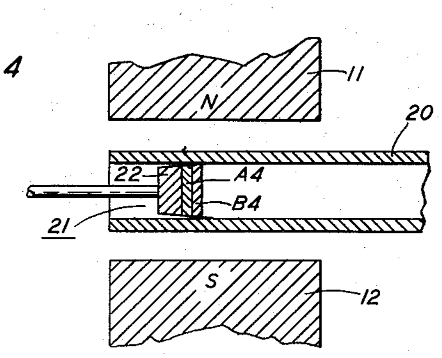
Fig. 4 represents a variable impedance termination.

Fig. 4 shows an adjustable terminating impedance 21 for the wave guide 20 with magnetic control of the resistive component and combined magnetic and mechanical control of the reactive component. The variable position short 21 may be composed of the conducting control plate 22, and the two ferromagnetically resonant control slabs A–4 and B–4 made of different materials. Variation of the applied direct current magnetic field H changes the absorption of the ferromagnetically resonant material, thus controlling the resistive component of the impedance looking into the slabs. There is some variation of the reactance as indicated by a shift in the location of the minimum. Correction or control of this minimum location can be made by movement of the position of the slabs longitudinally along the wave guide still keeping them within the influence of the field. Consequently, all values of impedance within the range of the absorption of the samples can be obtained. The reactive component is limited by the absorption of the material. Small changes in the effective position of the termination may be made by alternatively varying the field in the vicinity of resonance for the control slab A–4 or B–4, rather than by physically moving the termination.

In addition, one of the slabs may be dispensed with, leaving only a single ferromagnetically resonant slab backed by the conducting control plate. Using only a .010 inch thick slab of $Zn_{1/2}Mn_{1/2}Fe_2O_4$ ferrite with a resistivity of $10^5$ ohm-centimeters placed on the face of the variable position short, 24 decibels absorption was obtained.

Figure 5:
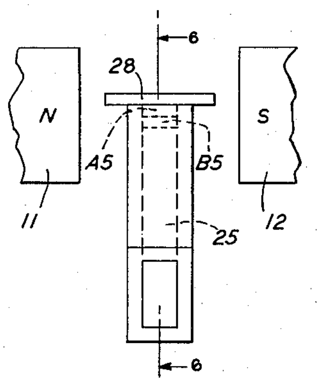
Figs. 5 and 6 illustrate a tuned cavity having a variable resonant frequency.
Figure 6:
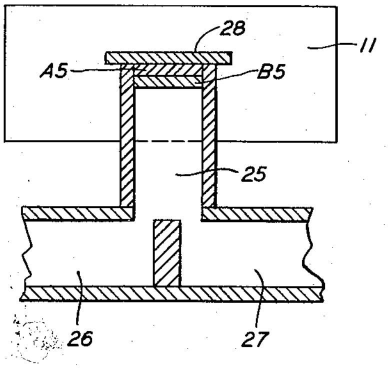

As shown in Figs. 5 and 6, the resonant frequency of the tuned cavity 25 in the wave guide 26—27 may be varied by changing the intensity of the magnetic field in the zone between the magnetic pole pieces 11 and 12. By this magnetic field variation, the effective position of the upper end of the cavity may be changed from the lower face of the conducting control plate 28 to the lower faces of either of the ferromagnetically resonant slabs A–5 or B–5 which face the cavity. This change in effective length of the cavity results in a shift of the resonant frequency. In one case using only a single slab of $Cu_4Zn_6Fe_2O_4$ ferrite, over the conducting control plate 28, a frequency shift of 750 megacycles was obtained by varying the magnetic field.

In some cases it would be desirable to have a broadened and thus less critical ferromagnetic resonance curve. This could be accomplished through the use of two distinct polycrystalline ferrites having closely spaced overlapping ferromagnetic resonance curves.

Figure 7:
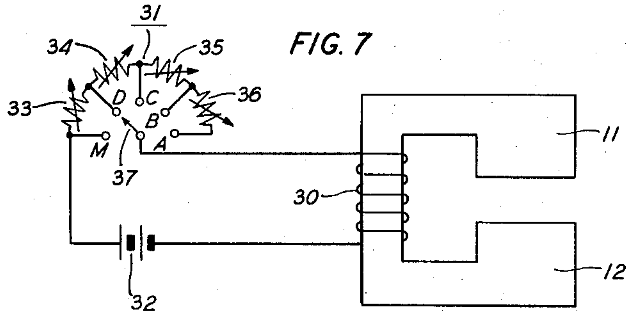
Fig. 7 is a schematic showing of the electromagnet energizing circuit for the devices of Figs. 1 through 4.

Fig. 7 illustrates an energizing circuit suitable for the electromagnet 30 having the pole pieces 11 and 12 which appear in many of the other figures of the drawings. The variable resistance 31 is in series with any suitable direct current source 32 and the electromagnet 30. This variable resistance 31 may be made up of a plurality of preset variable resistances 33—36 which may be selected by switch arm 37 at contacts A, B, C, D, or M. These switch arm positions are adjusted to give magnetic intensities between the pole pieces 11 and 12 corresponding to the resonance peaks A and B of Fig. 1, or the resonant points of slabs A, B and C of Fig. 3. Rapid switching from one resonant peak to another is thus facilitated. The field strength may also be continuously varied as desired by using one or more of the variable resistances 33—36.

In place of the electromagnet and control circuits of Fig. 7, a permanent magnet with suitable reluctance changing means, such as a variable shunt or series element, could be used.

It is to be understood that the above-described arrangements are merely illustrative of the application of the principles of the invention. Numerous other arrangements employing other ferromagnetically resonant materials than those noted herein, and using other geometrical arrangements or parts either in or out of enclosing wave guides may be devised by those skilled in the art without departing from the spirit and scope of the invention.

What is claimed is:

1. In combination, a channel for the transmission of electromagnetic energy, two control elements facing said channel, one of said elements having a particular attenuation versus magnetic field characteristic, and the other having a different attenuation versus magnetic field characteristic, a magnet having an induction zone which includes said control elements, and means for varying the magnetic intensity of said magnet.

2. In combination a wave guide section having a passage therethrough, two control elements facing said passage, one of which has a critical magnetic field for ferromagnetic resonance and the other having a different ferromagnetic resonance characteristic, a magnet having a zone of magnetic field strength which includes said control elements, and means for varying the magnetic intensity of said magnet through a range including said critical field.

3. In combination, a channel for the transmission of electromagnetic energy, two control elements facing said channel, said control elements being made of different ferrite materials, a magnet having an induction zone which includes said control elements, and means for varying the magnetic intensity of said magnet.

4. In a high frequency apparatus, a wave guide section, a first control element composed of a ferromagnetically resonant material facing said wave guide section, a second control element composed of a material having a different conductivity versus magnetic field characteristic than said first control element also facing said wave guide section, magnetic induction means inducing a magnetic field in said wave guide section in the vicinity of said control elements, and means for varying the magnetic intensity of said induction means.

5. In combination, a channel for the transmission of electromagnetic energy, two control elements successively facing said channel with one of said elements having a critical magnetic field for ferromagnetic resonance, and the other having a different attenuation versus magnetic field characteristic, a magnet having an induction zone which includes said control elements, whereby said electromagnetic energy is incident first on one of said elements and, if transmitted therethrough, is incident on the second one of said elements, and means for varying the magnetic intensity of said induction means.

6. In a high frequency electromagnetic device, a magnet, two ferrite elements having different ferromagnetic resonance characteristics in the induction zone of said magnet, and means for varying the magnetic intensity of said magnet.

7. In combination, a channel for the transmission of electromagnetic energy, two control elements facing said channel, one of said elements having a critical magnetic field for ferromagnetic resonance, the other having a different attenuation versus magnetic field characteristic, and a variable magnet for inducing a magnetic field in said elements.

8. A high frequency control circuit comprising a multibranch wave guide section with ferromagnetically resonant elements in the two branch arms of the wave guide section, a magnet having an induction zone including said elements, and means for varying the magnetic intensity of said magnet.

9. A high frequency wave guide circuit switching device comprising a principal wave guide channel and a branch wave guide channel, a slab of ferromagnetically resonant material positioned in said principal channel at an angle thereto and opposite said branch channel, and a vriable magnet for inducing a magnetic field in said material.

10. The device as set forth in claim 9 in which there is a plate of another ferromagnetically resonant material in said branch channel adjacent the junction of said wave guides and within the magnetic field of said magnet.

11. In combination, a channel for the transmission of electromagnetic energy, two control elements facing said channel, one of said elements having a critical magnetic field for ferromagnetic resonance and the other having a different attenuation versus magnetic field characteristic, a magnet having an induction zone which includes said control elements, and means for varying the magnetic intensity of said magnet.

12. In a unit for changing the operating conditions of a microwave network, a section of wave guide for the transmission of microwave energy, two control elements of polycrystalline ferrite material having an extent greater than one-half the cross-sectional area of said wave guide section located within said wave guide section, said elements having different ferromagnetic resonance points, means for inducing a magnetic field in said elements, and means for varying the strength of said magnetic field.

13. In combination, an electromagnetic wave guide system including a wave guide component having two substantially different and distinct conditions of operation and means for switching from one said condition of operation to the other, said means including two ferromagnetic control elements having ferromagnetic resonance at different field strengths closely coupled to said wave guide component, means for magnetizing said ferromagnetic elements, and means for varying the intensity of magnetization from the resonance field strength of one of said control elements to that of the other control element, whereby the wave guide may be switched from one condition of operation to the other.

14. In a unit for changing the operating conditions of a microwave structure, a section of wave guide for the transmission of microwave energy, two control elements of respectively different ferrite materials each having at least one dimension greater than one-half of the smallest cross-sectional dimension of said wave guide section located within said wave guide section, said control elements having different ferromagnetic resonance points, means for inducing a magnetic field in said elements, and means for varying the strength of said magnetic field.

15. A combination as defined in claim 14 wherein elongated input and output wave guides of substantially the same size as said section of wave guide are coupled thereto.

16. In combination, a first wave guide, a second wave guide connected to said first wave guide at a first junction point, a third wave guide connected to one of said first two wave guides near said junction point, a first control element located in and extending substantially across said first wave guide, a second control element located in and extending substantially across said second wave guide, said first and second control elements being composed of respectively different nonconducting ferromagnetic materials having respectively different resonance points, and means for applying a magnetic field to said control elements.

17. A combination as defined in claim 16 wherein said control elements are composed of respectively different ferrites.

18. In a high frequency apparatus, a wave guide section, a first control element composed of a ferromagnetically resonant material coupled to said wave guide section, a second control element also composed of a ferromagnetically resonant material coupled to said wave guide section, magnetic induction means inducing a magnetic field in said wave guide section in the vicinity of each of said control elements, and means for simultaneously varying the ferromagnetic impedance states of both of said two control elements to respectively different levels, said last-mentioned means including means for varying the magnetic intensity of the field applied to each of said two control elements.

References Cited in the file of this patent

UNITED STATES PATENTS

| | | |
|---|---|---|
| 2,402,948 | Carlson | July 2, 1946 |
| 2,589,494 | Hershberger | Mar. 18, 1952 |

OTHER REFERENCES

"Ferrite Materials" by Dr. D. Polder, Institution of Electrical Engineers Proceedings, May 1950, vol. 97, part II, pp. 246–256. (Copy in Scientific Library.)

Beljers: Physica, vol. XIV, No. 10, February 1949, pages 629–641. (Copy in Scientific Library.)

Reggia: Radio-Electronic Engineering, April 1953, pages 12–14, 24. (Copy in Scientific Library.)

Yager et al.: Physical Review, vol. 72, No. 1, 3rd Series, July 1, 1947, pages 80, 81. (Copy in Scientific Library.)